May 31, 1966  L. G. MILLER ETAL  3,254,290

PROTECTIVE MEANS FOR RECTIFIER APPARATUS

Filed Jan. 16, 1963

WITNESSES
Theodore F. Wrobel
Donald R. Lackey

INVENTORS
Lalan G. Miller
August P. Colaiaco
BY
F. E. Browder
ATTORNEY

United States Patent Office 3,254,290
Patented May 31, 1966

3,254,290
PROTECTIVE MEANS FOR RECTIFIER
APPARATUS
Lalan G. Miller, Pittsburgh, and August P. Colaiaco, Forest Hills, Pa., assignors to Westinghouse Electric Corporation, Pittsburgh, Pa., a corporation of Pennsylvania
Filed Jan. 16, 1963, Ser. No. 251,801
6 Claims. (Cl. 321—11)

This invention relates in general to protective systems and more particularly to protective systems for rectifier apparatus.

Rectifier apparatus utilizing semiconductor rectifier cells or diodes are subjected to surge voltages which may be initiated by many different sources. In protecting semiconductor rectifier cells from harmful voltage surges, the characteristics of the cells must be considered relative to the source of the voltage surges and the type of surge protection equipment available. In other words, the surge protection equipment used must be tailored to match the type of voltage surges the smiconductor rectifiers will be subjected to.

Each leg of the rectifier apparatus usually contains a plurality of series and parallel connected semiconductor diodes or rectifiers, with the number of diodes determined by the rated voltage and current of the rectifier leg and the voltage and current rating of the semiconductor diodes. Surge protection equipment must limit the total voltage across the rectifier leg so that any voltage surges do not exceed the peak voltage rating of the semiconductor diodes.

In addition to the protective equipment limiting the peak voltage across the rectifier leg, the surge protection equipment must be designed to cope with the type of surge produced by semiconductor rectifier cells known as a commutation voltage transient or spike caused by the rectifiers recovery characteristics and the source impedance of the alternating current system feeding the rectifier. More particularly, these voltage spikes arise from the hole storage phenomena which allows the rectifier cells to carry a heavy reverse current for a short period of time immediately after the forward conduction period, while the charge carriers are being swept out. The sudden cessation of the reverse current occurring when the stored carriers are depleted, causes the source impedance to generate the commutation voltage transient.

If two or more semiconductor rectifier cells are connected in series, one of the cells will generally recover first and support the entire initial inverse voltage until the other cells recover. Therefore, the surge protection equipment must be designed to allow all semiconductor rectifier cells to recover before the inverse voltage spike or transient on the first cell to recover has built up to a damaging value.

Further, the protective equipment should have adequate fuse protection along with indicating means to allow quick visual inspection to determine the particular rectifier leg containing any open fuses.

Accordingly, it is the general object of this invention to provide a new and improved protective system for rectifier apparatus.

Another object of this invention is to provide a new and improved protective system for rectifier apparatus that limits the peak voltage that can be applied to each leg of the rectifier apparatus.

Another object of this invention is to provide a new and improved protective system for rectifier apparatus that allows all rectifier cells in each leg of the rectifier to recover before the inverse voltage on the first cell to recover has built up to an excessive magnitude.

Another object of this invention is to provide a new and improved protective system for rectifier apparatus which limits the rate of application of inverse voltage.

Another object of this invention is to provide a new and improved protective system for rectifier apparatus that gives visual indication of fuse failure in any of the protective network sections of the protective system.

Briefly, the present invention accomplishes the above cited objects by providing means having a Zener type volt-ampere characteristic connected in a parallel circuit relationship around each rectifier leg to limit the maximum voltage that can be applied to the rectifier diodes in each rectifier leg. Further, resistance and capacitance means are connected in a parallel circuit relationship with each rectifier leg to reduce the commutation spikes and to reduce the rate of rise of inverse voltage to allow all diodes to recover before the inverse voltage on any cell has reached a damaging magnitude. Each of the parallel connected protective circuits is fused, with an indicating means being actuated by the opening of either fuse or both of them.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1:
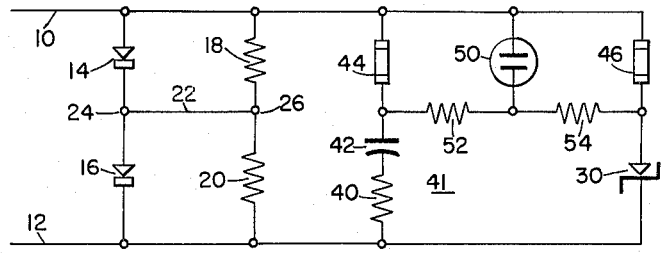
FIGURE 1 is a schematic diagram illustrating the principles of the invention.

Referring now to the drawings and FIG. 1 in particular, there is illustrated a schematic diagram embodying the principles of the invention. In particular, FIG. 1 represents one leg of a rectifier assembly and the associated protective system. Semiconductor diodes 14 and 16 are connected serially between line conductors 10 and 12. Two rectifier diodes are shown in FIG. 1 for simplicity, but it is to be understood that the invention is not to be so limited. It is equally applicable to any number of diodes per rectifier leg.

In order to cause the voltage across diodes 14 and 16 to divide substantially equal, resistors 18 and 20 are serially connected from conductor 10 to conductor 12 and a conductor 22 is connected from the junction 24 between diodes 14 and 16 to the junction 26 between resistors 18 and 20.

Figure 2:
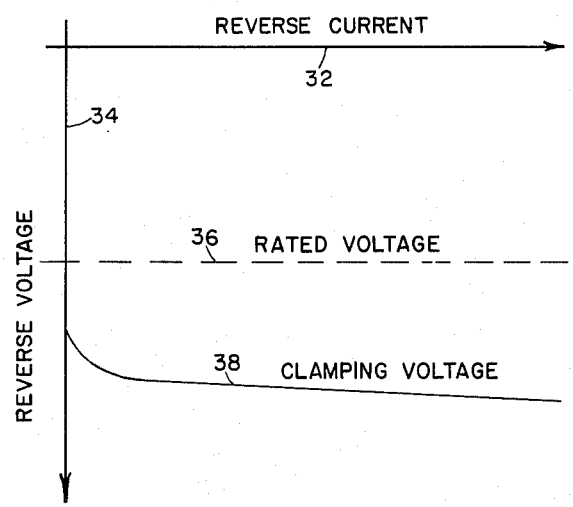
FIG. 2 is a graphic illustration of the Zener type volt-ampere characteristic required by a portion of the protective system shown in FIG. 1, and FIGS. 3A and 3D show typical voltage wave forms across each leg of the rectifier apparatus.

In order to prevent the voltage across diodes 14 and 16 from exceeding the peak voltage the diodes 14 and 16 can withstand without damage, rectifying means 30, having a Zener type volt-ampere characteristic, is connected from conductor 10 to conductor 12 in a parallel circuit relationship with diodes 14 and 16. A Zener type volt-ampere characteristic is that characteristic whereby a small current is allowed to flow below a certain predetermined voltage and upon exceeding said predetermined voltage a large current is allowed to flow with very little change in voltage. FIG. 2 graphically illustrates the Zener type volt-ampere characteristic, in which the abscissa 32 indicates instantaneous reverse current and the ordinate 34 indicates instantaneous reverse voltage. Rated voltage is depicted by dotted line 36 and the maximum or clamping voltage is shown as curve 38. It can be seen from FIG. 2 that the current is negligible until a certain reverse voltage is reached, at which time the current increases greatly, with very little change in voltage.

Many devices exhibit the necessary Zener type volt-ampere characteristic, such as certain selenium and silicon devices.

Referring again to FIG. 1, in order to smooth the transient surge voltages and modify the steep wave front of the commutation transient to allow all the diodes in a particular rectifier leg to recover after a forward conduction period before the first diode to recover is subjected to a transient voltage of damaging magnitude, a series resistance-capacitance circuit 41 is connected in a parallel circuit relationship with diodes 14 and 16. More specifically, resistor 40 and capacitor 42 are serially connected from conductor 10 to conductor 12. Since the capacitor 42 cannot be charged immediately, due to resistor 40 and the inherent circuit impedance, the steep wave front of the commutation spike produced by the inductive effect by the rest of the circuit when one diode recovers is modified to a less steep wave front, allowing sufficient time for the other diodes in the leg to recover before the commutation transient reaches magnitudes dangerous to the first diode to recover. Further, the magnitude of the commutation transient is reduced by the parallel circuit 41 provided by resistor 40 and capacitor 42, as it provides a path for the current from the circuit inductance to flow.

In order to provide protection for the circuit wiring, since the protective devices hereinbefore described are subject to failure themselves, fuses 44 and 46 may be provided. Fuses 44 and 46 should be sized to protect the wiring and not the capacitor 42 or Zener type device 30, so as not to interfere with the normal functioning of these devices in protecting the rectifier diodes 14 and 16.

While the combination of the resistor 40, capacitor 42 and rectifier means 30 could be fused as a unit, it is more desirable to fuse each parallel circuit separately in order to retain the functions of the remaining parallel circuit in case of failure of the other.

A single indicating means 50 may be used to indicate the failure of either or both of the fuses 44 and 46 by connecting one terminal of fuse 44 to the conductor 10 and one terminal of fuse 46 to conductor 10. Resistors 52 and 54 are serially connected from the remaining terminal of fuse 44 to the remaining terminal of fuse 46. The indicating means 50 is connected from conductor 10 to the junction of resistors 52 and 54. Resistors 52 and 54 are selected to allow the proper range of current to flow in indicating means 50 when either or both of the fuses 44 and 46 are open. Since approximately three times the amount of current will flow through indicating means 50 when both fuses 44 and 46 are open than when only one of said fuses is open, the indicating device selected must be able to operate satisfactorily over this range. Indicating means such as neon lamps will perform well over this range.

Figure 3A:
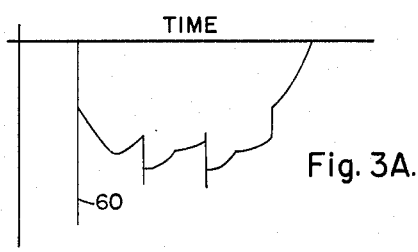
Figure 3B:
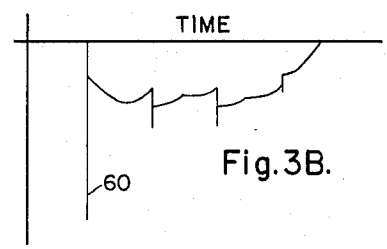
Figure 3C:
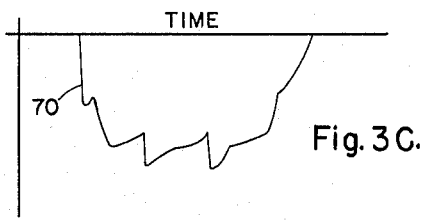
Figure 3D:
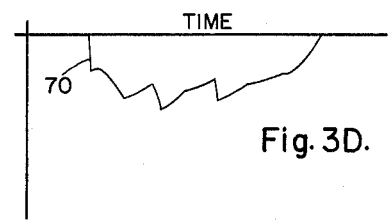

In the operation of the protective system shown in FIG. 1, the capacitor 42 and resistor 40 serially connected across the semiconductor diodes 14 and 16 eliminate the damaging effects of commutation spikes. FIG. 3A graphically illustrates the type of surge called a commutation spike. FIG. 3A illustrates the commutation spike across several diodes connected in series without any surge protection, and FIG. 3B illustrates the commutation spike, still without any surge protection, across the first diode to recover after a forward conduction period. It can be seen that the first diode to recover is subjected to the total initial inverse voltage 60. By providing a path for the current through the capacitor 42 and resistor 40, the initial commutation peak 70 is reduced greatly in magnitude as evidenced by FIGS. 3C and 3D, and the slope of the initial wave front is less steep, allowing all the diodes to recover and thus preventing the entire initial reverse voltage to be sustained by one diode. FIG. 3C illustrates the commutation transient across several series connected diodes when protected by a parallel resistance-capacitance network. FIG. 3D illustrates the commutation transient voltage across the first diode of the series circuit to recover, showing how the surge protective circuit has modified the slope of the initial voltage and how the transient magnitude has been greatly reduced. A side benefit obtained in reducing commutation voltage transients is the reduction of radio interference and pick-up in associated circuits.

However, even though the resistance-capacitance circuit cushions the rectifier diodes by sloping the initial voltage and tends to limit the magnitude of surge voltages by absorbing the surge energy, there is no voltage clamping action in a resistance-capacitance circuit. The voltage can continue to rise across the rectifier diodes 14 and 16 as long as the surge has sufficient energy to charge the capacitor 42. Since it is not possible to predict the surge energy available with different transients produced, the voltage must be limited to a magnitude less than the peak rated voltage of the semiconductor diodes. This is accomplished by the action of rectifier 30 having the Zener type volt-ampere characteristic. The size of the rectifier 30 should be selected to be compatible with the largest expected surge energy, however, rectifier 30 will limit surges of larger energies even if it has to fail itself in doing so. Even though the rectifier means 30 will clamp the voltage to a predetermined value, it will not eliminate the hole storage or commutation transient, nor will it eliminate the problem of one of the series diodes recovering first and sustaining the entire initial reverse voltage. Therefore, the resistance-capacitance protection circuit 41 is required in addition to the rectifier 30, with the two protective circuits cooperating to produce the type of surge protection that the rectifier system requires for complete protection.

Further, it can be seen that while rectifier 30 would provide overvoltage protection when connected in parallel with one diode, if only one diode were used per leg, rectifier 30 could not be used advantageously around each diode when two or more diodes are connected in series. The rectifier 30 must be placed in parallel with all of the series connected diodes, as shown in FIG. 1. For example, when two diodes are connected in series, the normal voltage across one cell would be doubled if the other cell failed, which would cause failure of a properly applied protective device 30 having a Zener volt-ampere characteristic. If the rectifier protective device 30 is applied to protect a rectifier cell when the other rectifier cell fails, then the clamping voltage would be so high that the rectifier device 30 would not protect the series connected rectifier cells from surge voltages when they are operating normally.

Further, while rectifier 30 would provide overvoltage protection when connected in parallel with one diode if only one diode were used per leg, the resistance-capacitance protective circuit 41 provides an additional margin of safety above that provided by the rectifier 30 alone. The resistance-capacitance protective circuit 41, by eliminating the commutation voltage spike, provides protection even in the event the inverse voltage characteristic of the rectifier diodes to be protected has been reduced below the inverse clamping voltage characteristic of the rectifier 30. Another advantage and improvement in rectifier apparatus protection that results from the cooperation of the resistance-capacitance circuit 41 with the Zener-type rectifier 30 is the additional surge protection provided for surge voltages of very high frequency or very steep wave fronts. While the resistance-capacitance protective circuit 41 may be considered to be a high-pass filter, the resistor 40 and capacitor 42 each have a certain amount of inductance, which reduces the upper frequency range of the pass band. The rectifier 30, however, has very little internal inductance and a relatively large shunt capacitance due to its method of construction. Therefore, rectifier 30 extends the pass band range of the resistance-capacitance protection circuit 41 and provides surge voltage protection for voltages of very high frequency, above the range of the resistance-capacitance circuit 41 when used alone. This effect of the rectifier 30 is independent of its voltage clamping characteristic. Thus, the rectifier 30 co-operates with the resistance-capacitance circuit 41 on high frequency or steep wave front voltage surges, even below its clamping voltage action.

Further, the resistance-capacitance circuit 41 reduces the duty imposed on the Zener type rectifier 30 by limiting the rate of application of inverse voltage transients applied to said Zener type rectifier. The Zener type rectifier 30 also reduces the duty imposed upon the resistance-capacitance circuit 41 by clamping any voltage transients to a predetermined magnitude and by extending the passband range of the resistance-capacitance circuit by providing a shunt path for transient voltages of very high frequency.

In summary, it can be seen that the combination of a resistance-capacitance protective circuit 41 and a Zener type rectifier protective circuit 30 into one coordinated protective system for rectifier apparatus produces protection for rectifier diodes beyond that provided by either type of protection alone, each circuit reducing the duty of the other circuit and each circuit adding to the range of protection of the other circuit.

It can, therefore, be seen that there has been disclosed a new and improved protective system for rectifier apparatus that limits the peak voltage that can be applied to the rectifier diodes in a leg of the rectifier apparatus and eliminates the problem caused by commutation transients when one diode of a series recovers first and sustains the entire initial reverse voltage until the other diodes recover. Further, even though the protective system takes the form of two separate circuits in parallel with the diodes of the rectifier leg, only one indicating device is required to visually indicate when fuses in either or both of said circuits has opened.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A protective circuit for rectifier devices comprising capacitance means, resistance means, said capacitance and resistance means being serially connected in parallel circuit relation with said rectifier devices, and means having the characteristic of allowing a small current to flow below a predetermined voltage and a large current to flow above said predetermined voltage with substantially no voltage change connected in parallel circuit relation with said resistance and capacitance means and said rectifier devices.

2. A protective circuit for rectifier devices comprising capacitance means, resistance means, said capacitance and resistance means being serially connected in parallel circuit relation with said rectifier devices, and a selenium device having a Zener type volt-ampere characteristic connected in parallel circuit relation with said resistance and capacitance means and said rectifier devices.

3. A protective circuit for rectifier devices comprising capacitance means, resistance means, said capacitance and resistance means being serially connected across said rectifier devices, and means having a Zener type volt-ampere characteristic connected in parallel circuit relationship with said resistance and capacitance means and said rectifier devices.

4. A protective circuit for rectifier means comprising first and second conductors, said rectifier means being connected in circuit relation with said first and second conductors, first resistance means, capacitance means, first fuse means, said first resistance means, capacitance means and first fuse means serially connected between said first and second conductors, second fuse means, means having a Zener type volt-ampere characteristic, said second fuse means and said Zener type means serially connected between said first and second conductors.

5. A protective circuit for rectifier means comprising first and second conductors, said rectifier means connected in circuit relation with said first and second conductors, first resistance means, capacitance means, first fuse means having first and second terminals, said first resistance means, capacitance means and first fuse means being serially connected between said first and second conductors, with the first terminal of said first fuse means being connected to said first conductor, second fuse means having first and second terminals, means having a Zener type volt-ampere characteristic, said second fuse means and said Zener type means being serially connected between said first and second conductors, with the first terminal of said second fuse means being connected to said first conductor, second and third resistance means serially connected from the second terminal of said first fuse means to the second terminal of said second fuse means, and indicating means connected from said first conductor to the junction between said second and third resistance means.

6. A protective circuit for rectifier means comprising first and second conductors, said rectifier means connected in circuit relation with said first and second conductors, first resistance means, capacitance means, first fuse means having first and second terminals, said first resistance means, capacitance means and first fuse means being serially connected between said first and second conductors, with the first terminal of said first fuse means being connected to said first conductor, second fuse means having first and second terminals, selenium rectifier means having a Zener type volt-ampere characteristic, said second fuse means and said selenium rectifier means serially connected between said first and second conductor, with the first terminal of said fuse means being connected to said first conductor, second and third resistance means serially connected between the second terminal of said first fuse and the second terminal of said second fuse means, and an indicating light connected from said first conductor to the junction between said second and third resistance means.

References Cited by the Examiner

UNITED STATES PATENTS

| | | | |
|---|---|---|---|
| 2,854,549 | 9/1958 | Duerkob | 200—133 |
| 2,895,100 | 7/1959 | Filberich | 321—11 |
| 3,109,134 | 10/1963 | Induni | 321—11 |

LLOYD McCOLLUM, *Primary Examiner.*

J. C. SQUILLARO, *Assistant Examiner.*